United States Patent
Inoue et al.

(10) Patent No.: US 7,113,892 B2
(45) Date of Patent: Sep. 26, 2006

(54) MECHANIC SKILL CONTROL SYSTEM

(75) Inventors: Masayuki Inoue, Tokyo (JP); Minoru Uchiyama, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/479,775

(22) PCT Filed: May 29, 2002

(86) PCT No.: PCT/JP02/05174

§ 371 (c)(1),
(2), (4) Date: Sep. 24, 2004

(87) PCT Pub. No.: WO02/103594

PCT Pub. Date: Dec. 27, 2002

(65) Prior Publication Data

US 2005/0216326 A1    Sep. 29, 2005

(30) Foreign Application Priority Data

Jun. 13, 2001 (JP) ............................. 2001-179259

(51) Int. Cl.
*G06F 15/00* (2006.01)
(52) U.S. Cl. .............................. 702/187; 701/29
(58) Field of Classification Search .................. None
See application file for complete search history.

(56) References Cited

U.S. PATENT DOCUMENTS

| | | | |
|---|---|---|---|
| 4,434,489 A | 2/1984 | Blyth | |
| 4,602,127 A | 7/1986 | Neely et al. | |
| 5,557,258 A | 9/1996 | Eslambolchi | |
| 6,308,120 B1* | 10/2001 | Good | 701/29 |
| 6,477,452 B1* | 11/2002 | Good | 701/29 |
| 6,810,362 B1* | 10/2004 | Adachi et al. | 702/187 |
| 6,813,549 B1* | 11/2004 | Good | 701/29 |
| 6,907,384 B1* | 6/2005 | Adachi et al. | 702/184 |
| 6,959,235 B1 | 10/2005 | Abdel-Malek et al. | |
| 2002/0143445 A | 10/2000 | Sinex | |
| 2002/0032505 A1* | 3/2002 | Good | 701/29 |
| 2002/0059320 A1* | 5/2002 | Tamaru | 707/200 |
| 2002/0069216 A1* | 6/2002 | Bates | 707/500 |
| 2003/0114967 A1* | 6/2003 | Good | 701/29 |
| 2003/0171981 A1* | 9/2003 | Bargnes et al. | 705/11 |
| 2005/0090951 A1* | 4/2005 | Good | 701/29 |
| 2005/0149237 A1* | 7/2005 | Bates | 701/29 |

(Continued)

FOREIGN PATENT DOCUMENTS

EP      0 866411 A1    9/1998

(Continued)

*Primary Examiner*—Carol S. W. Tsai
(74) *Attorney, Agent, or Firm*—Carrier, Blackman & Associates, P.C.; Joseph P. Carrier; William D. Blackman

(57) ABSTRACT

A mechanic skill managing system includes a first database storing an average operation time for every kind of check/repair, the average operation time being a time required for an average mechanic with an average skill to complete the check/repair, and a second database storing a skill value indicative of skill of a mechanic, both of which are connected to a processor. The processor calculates the skill value of the mechanic based on a difference or a ratio between the average operation time stored in the first database and an actual operation time spent by the mechanic to actually complete the check/repair, and registers the skill value in the second database. Thus, the skill of the mechanic can be grasped accurately and can be applied to various operations.

15 Claims, 2 Drawing Sheets

U.S. PATENT DOCUMENTS

2005/0273228 A1 * 12/2005 Tsubota et al. ............... 701/29

FOREIGN PATENT DOCUMENTS

| | | |
|---|---|---|
| EP | 1204057 A1 * | 5/2002 |
| JP | 63-285669 | 11/1988 |
| JP | 04-104472 U | 9/1992 |
| JP | 06-044252 | 2/1994 |
| JP | 06-195351 | 7/1994 |
| JP | 10-244912 | 9/1998 |
| JP | 10-261122 | 9/1998 |
| JP | 3060621 U | 6/1999 |
| JP | 2000-020581 | 1/2000 |
| JP | 2000-214905 | 8/2000 |
| JP | 2000-218475 | 8/2000 |
| JP | 2000-218477 | 8/2000 |
| JP | 2000-305990 | 11/2000 |
| JP | 2000-357164 | 12/2000 |
| JP | 2002245376 A * | 8/2002 |

* cited by examiner

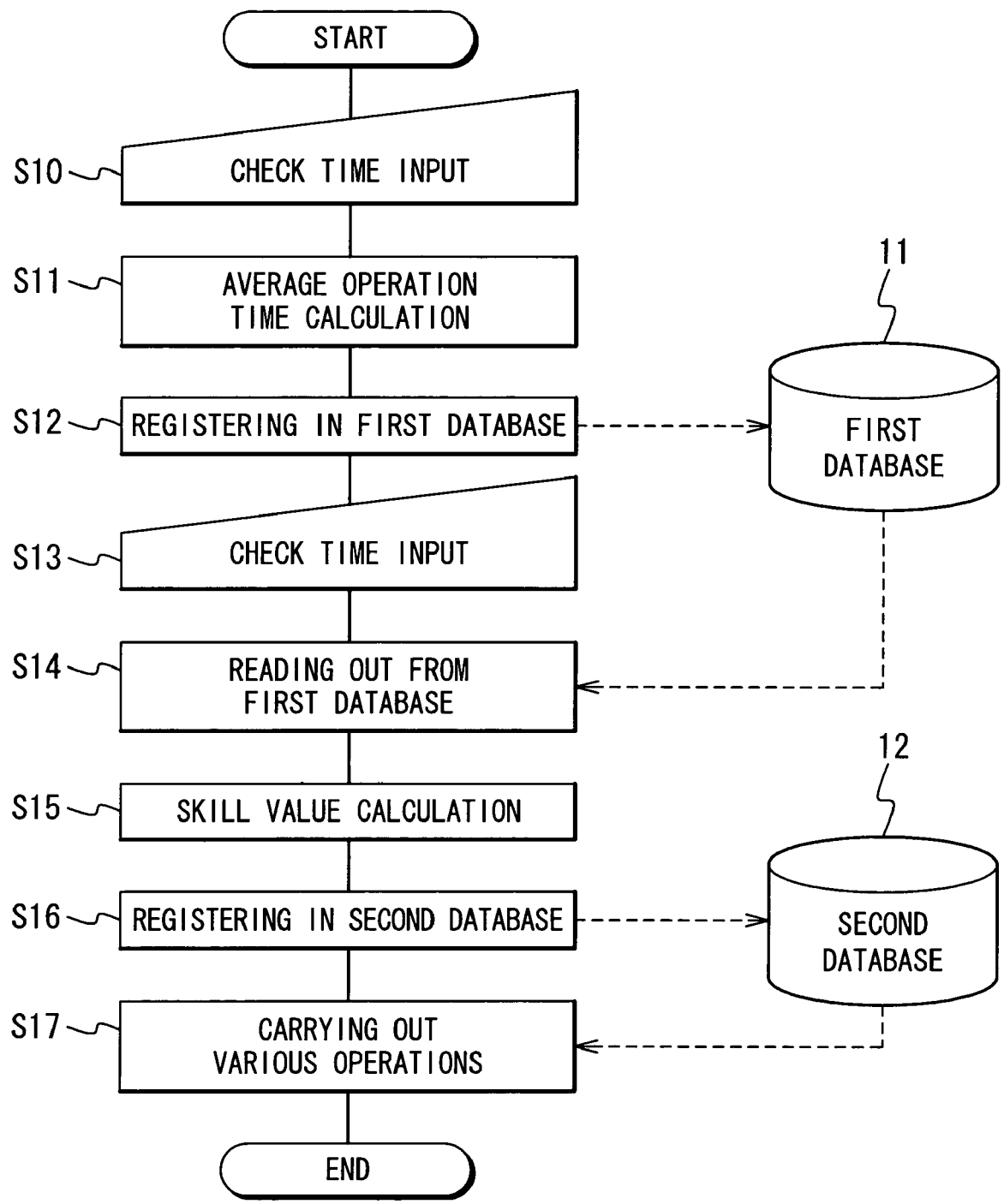

MECHANIC SKILL CONTROL SYSTEM

TECHNICAL FIELD

The present invention relates to a system for managing skill of a mechanic, and more particularly to a technique for managing skill of a mechanic who is engaged in check and repair (hereafter, the check and repair may be merely referred to as a "Check" in this specification).

BACKGROUND ART

Conventionally, a check of a vehicle has been carried out in a maintenance shop by request of a user. In this case, in the maintenance shop, a total man-hour is calculated by adding up respective man-hours in a plurality of check items defined for each kind of the check. Here, the man-hour means a work amount carried out by one worker in a unit time when a work load is represented by using time as a unit. Then, an operation is carried out by referring to a maintenance schedule controlled in the maintenance shop, assigning a day and an hour for the requested check on which the total man-hour can be accomplished, and carrying out the maintenance.

As such a technique, for example, Japanese Laid Open Patent Application (JP-P2000-20581A) discloses a "System for Managing Vehicle Storage for Maintenance". In this system, a client enters desired maintenance contents and desired storage terms by using a terminal. In response to this procedure, a host computer calculates a period necessary for the maintenance on the basis of the desired maintenance contents, and then searches a storing/retrieving management table stored in a memory apparatus of the host computer for an available period for the maintenance on the basis of the desired storage terms of the client. Then, an optimal date in this period for the storage is automatically determined and displayed on the terminal. In response to a confirmation of the client through the terminal, the optimal date of storage and a date of retrieval determined from the date of storage are automatically registered in the storing/retrieving management table, and so a storage reservation is made. Thus, clients can register the storage by themselves.

When the check of the vehicle is requested as mentioned above, the man-hour is calculated on the basis of a standard man-hour. This standard man-hour is pre-determined by averaging experience and performance of a plurality of mechanics. Therefore, a time necessary for the check varies widely from a mechanic with a high skill and a mechanic without that high skill. Incidentally, in recent years, the request for the check of the vehicle is made in various ways. For example, there are many clients in recent years who want the check to be completed in a short time such as 0.5 hours or one hour on their way to offices.

However, conventionally, the time necessary for the requested check has been calculated on the basis of the standard man-hour, and whether the requested check can be accepted or not is determined on the basis of the calculated time. Hence, the requested check is sometimes determined to be unacceptable even when a mechanic with the high skill can complete the requested check within the time to meet the client's requirement. It is therefore desired to develop a system in which the skill of the mechanics can be grasped accurately and a proper mechanic can be assigned to the requested check so that the requested check is completed within the appointed date according to the user's requirement.

The present invention is proposed in order to cope with the above-mentioned request. The object is to provide a mechanic skill managing system, in which skill of a mechanic can be grasped accurately and can be applied to various operations.

DISCLOSURE OF INVENTION

The means for achieving the object will be described below in this section using reference numerals and symbols used in "Best Mode for Carrying Out the Invention". These reference numerals and symbols are added so that relation between the description of "Claims" and the description of "Best Mode for Carrying Out the Invention" is made clear. Therefore, it is never permitted to use the reference numerals and symbols for the interpretation of technical scopes of the inventions described in "Claims".

In order to attain above object, a mechanic skill managing system includes a first database (11) for storing an average operation time for every kind of check/repair, the average operation time being a time required for an average mechanic having an average skill to complete the check/repair, a second database (12) for storing a skill value indicative of skill of a mechanic, and a processor (10) for calculating the skill value of the mechanic based on a difference or a ratio between the average operation time stored in the first database (11) and an actual operation time spent by the mechanic to actually complete the check/repair, and for registering the skill value in the second database (12).

In this mechanic skill managing system, each of the average operation time and the actual operation time mentioned above means a time necessary for completing a check and a repair to the extent that a predetermined quality standard for the check and the repair is cleared.

According to this mechanic skill managing system, the skill of the mechanic can be accurately grasped, because the skill value of the mechanic is calculated on the basis of the difference or the ratio between the average operation time and the actual operation time spent by the mechanic to actually complete the check/repair, and the calculated skill value is registered in the second database (12). As a result, for example, a control of equalizing the mechanics between affiliated dealers can be attained.

In this mechanic skill managing system, the average operation time stored in the first database (11) is calculated by averaging a plurality of times spent by a plurality of mechanics to actually complete the check/repair, except a peculiar time. According to this configuration, it is possible to objectively suppose the mechanic with the average skill.

Also, in this mechanic skill managing system, the second database (12) further includes information indicative of history of training attendances and years of experience, and the skill value of the mechanic is calculated in the processor (10) on the basis of the difference or the ratio, and the information indicative of the history of training attendances and the years of experience stored in the second database (12). According to this configuration, the skill of the mechanic is determined by considering not only the actual operation time but also the history of training attendances and the years of experience. Thus, the skill value given to the mechanic becomes further universal.

Also, in this mechanic skill managing system, the processor (10) further determines whether a requested check/repair of a vehicle is acceptable or not, based on the skill value of the mechanic registered in the second database (12). According to this configuration, it is possible to improve the accuracy of the decision of acceptance/rejection with regard to the check/repair of the vehicle.

Moreover, in this mechanic skill managing system, the processor (10) further determines compensation for work of the mechanic, based on the skill value of the mechanic registered in the second database (12). According to this configuration, it is possible to fairly evaluate the mechanic and thereby pay the reward to the mechanic. Thus, it is possible to increase the aspiration and motivation of the mechanic.

BRIEF DESCRIPTION OF DRAWINGS

FIG. 2 is a flowchart describing an operation of the mechanic skill managing system according to a best mode for carrying out the present invention.

BEST MODE FOR CARRYING OUT THE INVENTION

Figure 1:
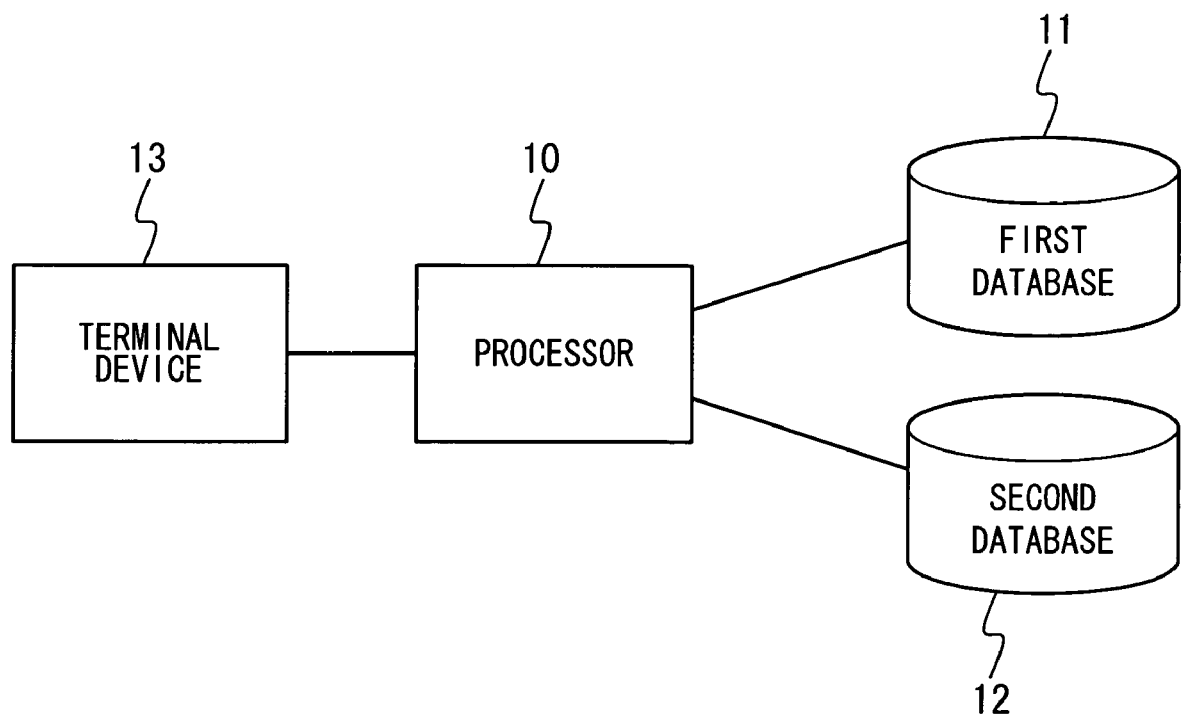
FIG. 1 is a block diagram showing a configuration of a mechanic skill managing system according to a best mode for carrying out the present invention.

A mechanic skill managing system according to a best mode for carrying out the present invention, will be described below in detail with reference to the drawings.

FIG. 1 is a block diagram showing a schematic configuration of the mechanic skill managing system according to the best mode for carrying out the present invention. This mechanic skill managing system includes a processor 10, and a first database 11, a second database 12 and a terminal device 13, which are connected to the processor 10.

The processor 10 is composed of an information processor such as a personal computer, a workstation or a general-purpose computer. In response to a command from the terminal device 13, this processor 10 carries out various operations on the basis of data stored in the first database 11 and the second database 12. The detail of the operations which this processor 10 carries out will be described later.

The first database 11 can be built on a disc device, for example. This first database 11 stores an average operation time (FRT: Flat Rate Time) for each of vehicle check items (kinds), the FRT being a time required for a mechanic having an average skill to complete the check. Also, this average operation time means a time necessary for carrying out a check and a repair to the extent that a predetermined quality standard for the check and the repair is fulfilled. This first database 11 stores about 60,000 kinds of the items as the check items. Thus, the average operation time of the mechanic, namely, a skill value of the mechanic can be specified for each check item in detail. Hence, it is possible to calculate precisely the time necessary for the check.

This first database 11 is prepared for each vehicle model. Therefore, every time a new vehicle type is developed and a vehicle model is changed, a first database 11 is prepared and used for the check of that vehicle. It should be noted that the skill value of the mechanic having the average skill varies according to country and area. In this case, a value obtained by multiplying the average operation time stored in the first database 11 by a predetermined coefficient can be used so as to cope with the actual situations of the respective countries and areas.

The second database 12 can be built on a disc device, for example. This second database 12 stores skill information composed of a plurality of skill values, respective of which indicate skills of a plurality of mechanics. More specifically, the second database 12 stores the contents of skill of each mechanic such as history of training attendances, years of experience, hours of actual operations, contents of previously experienced checks (repairs) and the like, and also stores the skill values obtained by converting such contents into numerals in accordance with a predetermined rule.

The terminal device 13 is composed of, for example, a keyboard and a monitor device. This terminal device 13 is used for entering information to the processor 10 and displaying results of the operations in the processor 10.

Next, operations of the mechanic skill managing system in the above-mentioned configuration according to the best mode for carrying out the present invention will be described below with reference to a flowchart shown in FIG. 2.

In this mechanic skill managing system, registration of the average operation time is firstly carried out (Steps S10 to S12). Next, registration of the skill value is carried out (Steps S13 to S16). After that, various operations are carried out based on the registered skill value (Step S17).

In the steps of the registration of the average operation time, the average operation time is calculated and registered in the first database 11. More specifically, first of all, n mechanics (n is an integer equal to or greater than 3) actually perform a checking work for a predetermined check item and measure a checking time. Then, the measured checking times (the actual operation time from the start to the end of the checking operation) for the n mechanics are inputted to the processor 10 through the terminal device 13 (Step S10). The actual operation time mentioned above means a time necessary for carrying out a check and a repair to the extent that a predetermined quality standard for the check and the repair is fulfilled.

Next, the processor 10 calculates the average operation time (Step S11). Calculated in this operation is the average of the checking times of the (n−2) mechanics, in which the checking times of the mechanic spending the longest time for the checking work and the mechanic spending the shortest time for the checking work are excluded from the calculation (the excluded checking times are referred to as "Peculiar Time").

Next, the processor 10 registers the average value calculated at the above-mentioned Step S11 in the first database 11 as the average operation time (Step S12). The steps S10 to S12 are carried out for all the check items of about 60,000 kinds, the illustration of which is omitted in FIG. 2. Consequently, the first database 11 is completed.

It should be noted that the above-mentioned n can be about "10". In this case, calculated in the calculation step of the average operation time is the average value of the checking times of 8 mechanics without the peculiar time. Also, in the calculation of the average operation time, the peculiar time can include the checking times of the two mechanics spending the longest time and the second longest time for the checking work, and the checking times of the two mechanics spending the shortest time and the second shortest time for the checking work. In this case, the average value of the checking times of the six mechanics is calculated.

In the steps of the registration of the skill value, the skill value of each mechanic is calculated and registered in the second database 12. More specifically, first of all, one mechanic actually performs a checking work for a predetermined check item and measures a checking time. Then, the measured checking time is inputted to the processor 10 through the terminal device 13 (Step S13). Next, the average operation time of the above-mentioned predetermined check item is read out from the first database 11 (Step S14).

Next, the processor 10 calculates the skill value (Step S15). More specifically, the processor 10 calculates difference between the actual checking time inputted at the Step S13 and the average operation time read out at the Step S14. Then, the calculated skill values are classified into, for example, four ranks, depending on the value of the calculated difference. It should be noted that a ratio of the actual checking time inputted at the Step S13 to the average operation time read out at the Step S14 can be used in this calculation of the skill value. In this case, the calculated skill values are classified into, for example, four ranks depending on the value of this calculated ratio.

Next, the processor 10 registers the rank classified at the Step S15 in the second database 12 as the skill value of that mechanic for that checking item (Step S16).

The operations in the above-mentioned Steps S13 to S16, in which the skill values are calculated by carrying out the check/repair and measuring the checking time, are actually performed on only the typical check/repair items with regard to the major classification such as an engine, a transmission and so on, the illustration of which is omitted in FIG. 2. The skill values for the other check/repair items are calculated by deducing from the above-mentioned actual result. The usage of such a method makes it possible to calculate the respective skill values for the check items of about 60,000 items effectively. Thus, the second database 12 for one mechanic is completed.

It should be noted that the registration of the skill values in the second database 12 is carried out all at once in the above description. However, it is also possible to update the contents of the second database 12 every time a mechanic actually carries out check/repair by measuring the time required for that check/repair and calculating a skill value on the basis of the measured time as a new skill value for the check item associated with that check/repair. According to this method, the skill values stored in the second database 12 are changed to the latest skill values in accordance with the skill-up of the mechanics. Also, the deduced skill values are changed to the actual skill values. Thus, it is possible to always grasp the accurate skill values of the mechanics.

After the first database 11 and the second database 12 are completed as mentioned above, various operations using the skill values registered in the second database 12 are carried out as described below (Step S17).

As an example, the various operations include a check reservation operation for determining whether a requested check of a vehicle is acceptable or not. In this case, when the desired delivery date with regard to a reservation is near and it is necessary to judge whether or not the requested check of a vehicle can be fit in the maintenance schedule of the maintenance shop, for example, it is possible to assign a mechanic having a high skill value to the requested check by searching the second database 12. According to this method, it is possible to improve the accuracy of the decision of acceptance/rejection with regard to the check of the vehicle. It is also possible to carry out the check in the short period to fulfill the requirement of the client.

As another example, the above-mentioned various operations include an operation for evaluating a mechanic. In this case, compensation for work of a mechanic can be determined on the basis of the skill value. According to this method, it is possible to fairly evaluate the mechanic and pay the reward to the mechanic. Thus, it is possible to increase the aspiration and motivation of the mechanic.

Moreover, as still another example, the above-mentioned various operations include an operation for equalizing the mechanics between affiliated dealers.

As described above, according to the mechanic skill managing system in the best mode for carrying out the present invention, a skill value of a mechanic is calculated on the basis of the difference or the ratio between the average operation time and the actual operation time spent by the mechanic to actually carry out the check/repair, and the calculated skill value is registered in the second database. Thus, it is possible to accurately grasp the skills of the mechanics.

It should be noted that although the mechanic skill managing system, according to the best mode for carrying out the present invention, is designed such that the skill value is determined on the basis of the difference or the ratio between the average operation time and the actual operation time spent by the mechanic, it can be designed such that history of the training attendances and years of experience of the mechanic are further registered in the second database 12, and the skill value is calculated by taking them into consideration at the above-mentioned Step S15. According to this method, the skill value given to the mechanic becomes further universal.

Moreover, the contents of the second database 12 can be configured to be updated periodically. According to this configuration, the skill value reflecting the effect of self-training can be given to the mechanic. Thus, it is possible not only to fairly evaluate the mechanic but also to increase aspiration and motivation of the mechanic.

INDUSTRIAL APPLICABILITY

As described above in detail, according to the mechanic skill managing system of the present invention, the skill of the mechanic can be grasped accurately and can be applied to various operations.

Although there has been described what is the present embodiment of the invention, it will be understood that variations and modifications may be made thereto without departing from the spirit or essence of the invention.

What is claimed is:

1. A mechanic skill managing system comprising:
   a first database storing an average operation time for every kind of check/repair, said average operation time being a time required for an average mechanic having an average skill to complete said check/repair;
   a second database storing a skill value indicative of skill of a mechanic; and
   a processor calculating said skill value of said mechanic based on a difference or a ratio between said average operation time stored in said first database and an actual operation time spent by said mechanic to actually complete said check/repair, and registering said skill value in said second database,
   wherein said average operation time stored in said first database is calculated by averaging a plurality of times spent by a plurality of mechanics to actually complete said check/repair, except a peculiar time.

2. A mechanic skill managing system comprising:
   a first database storing an average operation time for every kind of check/repair, said average operation time being a time required for an average mechanic having an average skill to complete said check/repair;
   a second database storing a skill value indicative of skill of a mechanic; and
   a processor calculating said skill value of said mechanic based on a difference or a ratio between said average operation time stored in said first database and an actual operation time spent by said mechanic to actually complete said check/repair, and registering said skill value in said second database, wherein said second database further comprises information indicative of history of training attendances and years of experience, and said skill value of said mechanic is calculated in said processor based on said difference or said ratio, and said information indicative of said history of training attendances and said years of experience stored in said second database.

3. The mechanic skill managing system according to claim 1, wherein said second database further comprises information indicative of history of training attendances and years of experience, and said skill value of said mechanic is calculated in said processor based on said difference or said ratio, and said information indicative of said history of training attendances and said years of experience stored in said second database.

4. The A mechanic skill managing system comprising:

a first database storing an average operation time for every kind of check/repair, said average operation time being a time required for an average mechanic having an average skill to complete said check/repair;

a second database storing a skill value indicative of skill of a mechanic; and a processor calculating said skill value of said mechanic based on a difference or a ratio between said average operation time stored in said first database and an actual operation time spent by said mechanic to actually complete said check/repair, and registering said skill value in said second database, wherein said processor further determines whether a requested check/repair of a vehicle is acceptable or not, based on said skill value of said mechanic registered in said second database.

5. The mechanic skill managing system according to claim 1, wherein said processor further determines whether a requested check/repair of a vehicle is acceptable or not, based on said skill value of said mechanic registered in said second database.

6. The mechanic skill managing system according to claim 2, wherein said processor further determines whether a requested check/repair of a vehicle is acceptable or not, based on said skill value of said mechanic registered in said second database.

7. The mechanic skill managing system according to claim 3, wherein said processor further determines whether a requested check/repair of a vehicle is acceptable or not, based on said skill value of said mechanic registered in said second database.

8. The A mechanic skill managing system comprising:

a first database storing an average operation time for every kind of check/repair, said average operation time being a time required for an average mechanic having an average skill to complete said check/repair;

a second database storing a skill value indicative of skill of a mechanic; and a processor calculating said skill value of said mechanic based on difference or a ratio between said average operation time stored in said first database and an actual operation time spent by said mechanic to actually complete said check/repair, and registering said skill value in said second database, wherein said processor further determines compensation for work of said mechanic, based on said skill value of said mechanic registered in said second database.

9. The mechanic skill managing system according to claim 1, wherein said processor further determines compensation for work of said mechanic, based on said skill value of said mechanic registered in said second database.

10. The mechanic skill managing system according to claim 2, wherein said processor further determines compensation for work of said mechanic, based on said skill value of said mechanic registered in said second database.

11. The mechanic skill managing system according to claim 3, wherein said processor further determines compensation for work of said mechanic, based on said skill value of said mechanic registered in said second database.

12. The mechanic skill managing system according to claim 4, wherein said processor further determines compensation for work of said mechanic, based on said skill value of said mechanic registered in said second database.

13. The mechanic skill managing system according to claim 5, wherein said processor further determines compensation for work of said mechanic, based on said skill value of said mechanic registered in said second database.

14. The mechanic skill managing system according to claim 6, wherein said processor further determines compensation for work of said mechanic, based on said skill value of said mechanic registered in said second database.

15. The mechanic skill managing system according to claim 7, wherein said processor further determines compensation for work of said mechanic, based on said skill value of said mechanic registered in said second database.

* * * * *